UNITED STATES PATENT OFFICE.

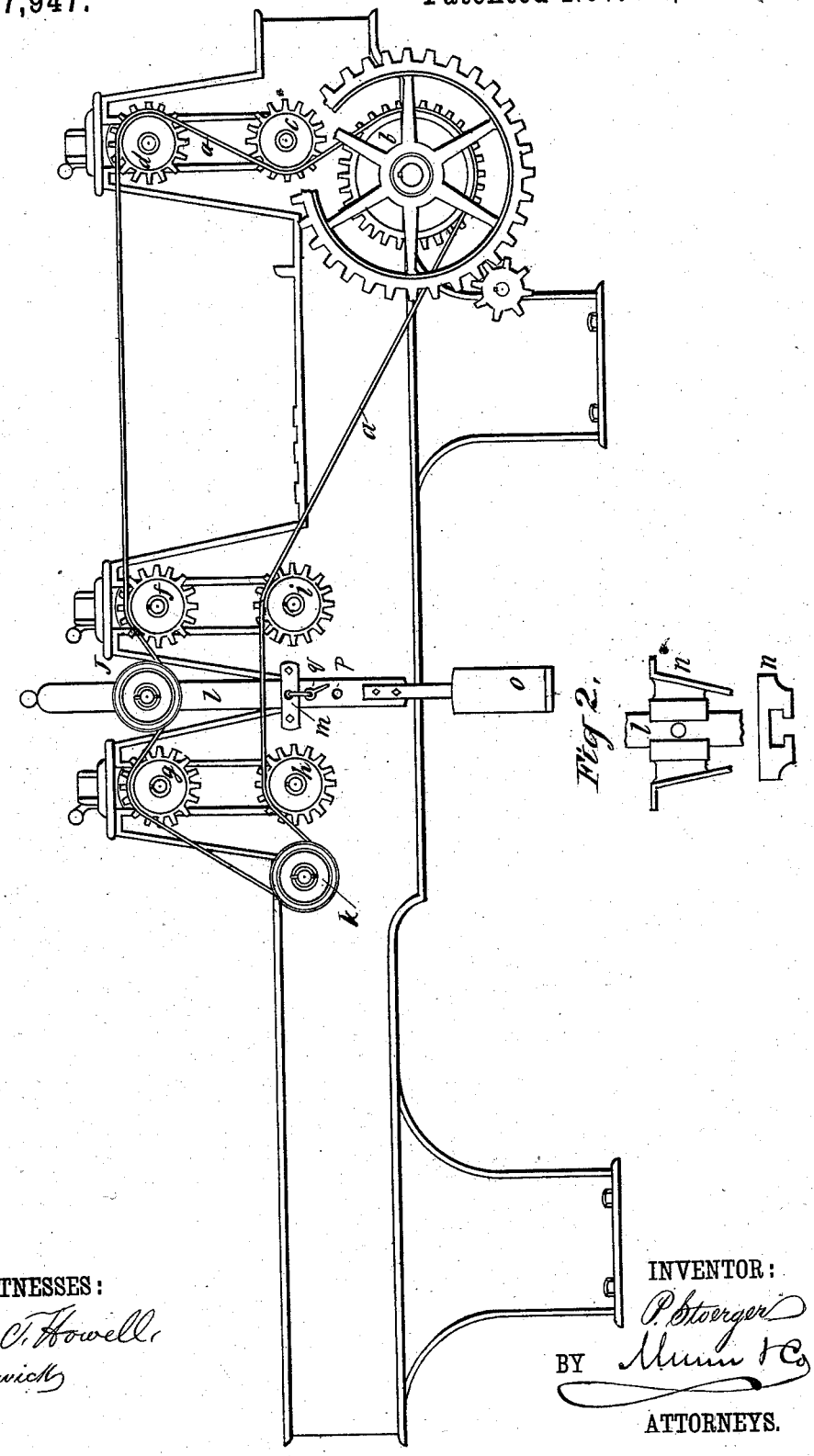

PAUL STOERGER, OF CHICAGO, ILLINOIS.

FEED-ROLLER GEAR FOR WOOD-PLANERS.

SPECIFICATION forming part of Letters Patent No. 267,947, dated November 21, 1882.

Application filed July 27, 1882. (No model.)

*To all whom it may concern:*

Be it known that I, PAUL STOERGER, of Chicago, Cook county, Illinois, have invented a new and Improved Feed-Roller Gear for Wood-Planers, of which the following is a full, clear, and exact description.

My invention consists of a chain-belt contrivance to be used in substitution of the toothed gears now employed, by which economy of driving-power will be effected, and a wider range of adjustment is provided for the upper rollers, and other advantages are gained, all as hereinafter fully described.

Reference is to be had to the accompanying drawings, forming part of this specification, in which similar letters of reference indicate corresponding parts in both figures.

Figure 1 is a side elevation of a planing-machine having the feed-roller gear of my invention applied to it, and Fig. 2 represents details of the said gear.

I use an endless chain, $a$, in substitution of the gears, running it from the driver $b$ to the left of the feed-roller pinion $c$, thence to the right, over roller-pinion $d$, thence over roller-pinions $f$ $g$, and back over roller-pinions $h$ $i$, thus connecting it so as to turn the respective rollers in the right direction, and by passing it between rollers $c$ and $d$, as stated, obtain the necessary contact of the chain.

Between rollers $f$ and $g$ the requisite contact is obtained by the tightener $j$, and the same is accomplished for the rollers $h$ and $i$ by the guide-roller $k$, located between rollers $g$ and $h$, and relatively thereto, as shown.

The tightener $j$ is attached to a vertical bar, $l$, having a weight, $o$, for producing the necessary tension, and arranged in guides $m$ or $n$, of any approved form or arrangement, to keep it in position. The bar $l$ has a pin-hole, $p$, and a pin, $q$, is provided for holding up the weight whenever it may be required to take off the tension for any purpose.

It will be seen that the slack of the chain under tightener $j$ will vary as the height of the upper feed-rollers varies, and that the extent of such slack may be such as to allow a wide range of variation to the rollers for different thicknesses of lumber.

It will also be seen that several intermediate pinions and their bearings and other adjuncts will be dispensed with by this chain contrivance, and it is believed that the friction will be materially lessened.

I am aware that there has been heretofore a mechanism for operating feed-rollers, consisting of a stationary drive-wheel, a spur-wheel, an adjusting-wheel, and an endless chain; but

What I claim as new and of my invention is—

The combination, with the driver $b$, the superposed feed-roll pinions $c$ $d$, and the roller-pinions $f$ $i$ $g$ $h$, parallel to the feed-rolls, of the endless chain $a$, passing up from the side pulley of one feed-roll pinion diagonally across and over the other, then straight over the side pulley of the roller-pinion $f$, then under the tightener $j$, then over the side pulley of pinion $g$, then around the tightener $k$, then straight over the side pulleys of pinions $h$ $i$, and then back to the side pulley of driver $b$, as described.

PAUL STOERGER.

Witnesses:
JOSEPH SCHULTE,
GEORGE STOERGER.